United States Patent
Baier et al.

(10) Patent No.: US 7,974,937 B2
(45) Date of Patent: Jul. 5, 2011

(54) ADAPTIVE EMBEDDED HISTORIANS WITH AGGREGATOR COMPONENT

(75) Inventors: John J. Baier, Mentor, OH (US); Robert J. McGreevy, Oswego, IL (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 911 days.

(21) Appl. No.: 11/750,193

(22) Filed: May 17, 2007

(65) Prior Publication Data

US 2008/0288775 A1 Nov. 20, 2008

(51) Int. Cl.
*H04L 9/00* (2006.01)
(52) U.S. Cl. .................. 706/50; 382/294; 705/2; 705/3; 709/205
(58) Field of Classification Search .................... 706/11, 706/47; 348/143, 150
See application file for complete search history.

(56) References Cited

U.S. PATENT DOCUMENTS

| | | | |
|---|---|---|---|
| 4,510,565 A | 4/1985 | Dummermuth |
| 4,553,205 A | 11/1985 | Porchia |
| 4,616,333 A | 10/1986 | Shimoni |
| 4,718,025 A | 1/1988 | Minor et al. |
| 4,731,735 A | 3/1988 | Borgendale et al. |
| 4,773,028 A | 9/1988 | Tallman |
| 4,831,529 A | 5/1989 | Miike et al. |
| 4,975,865 A | 12/1990 | Carette et al. |
| 5,003,469 A | 3/1991 | Kamiyama et al. |
| 5,051,932 A | 9/1991 | Inove et al. |
| 5,274,781 A | 12/1993 | Gibart |
| 5,452,201 A | 9/1995 | Pieronek et al. |
| 5,568,383 A | 10/1996 | Johnson et al. |
| 5,805,442 A | 9/1998 | Crater et al. |
| 5,901,323 A | 5/1999 | Milliken et al. |
| 5,943,675 A | 8/1999 | Keith et al. |
| 5,991,793 A | 11/1999 | Mukaida et al. |
| 6,092,036 A | 7/2000 | Hamann |
| 6,110,214 A | 8/2000 | Klimasauskas |
| 6,139,201 A | 10/2000 | Carbonell et al. |
| 6,198,480 B1 | 3/2001 | Cotugno et al. |
| 6,204,782 B1 | 3/2001 | Gonzalez et al. |
| 6,219,649 B1 | 4/2001 | Jameson |
| 6,233,623 B1 | 5/2001 | Jeffords et al. |
| 6,252,589 B1 | 6/2001 | Rettig et al. |
| 6,263,487 B1 | 7/2001 | Stripf et al. |

(Continued)

FOREIGN PATENT DOCUMENTS

EP 0490864 6/1992

(Continued)

OTHER PUBLICATIONS

OA dated Jan. 4, 2010 for U.S. Appl. No. 11/558,710, 37 pages.

(Continued)

*Primary Examiner* — Donald Sparks
*Assistant Examiner* — Ola Olude Afolabi
(74) *Attorney, Agent, or Firm* — Turocy & Watson LLP; William R. Walbrun; John M. Miller

(57) ABSTRACT

Systems and methods that aggregate history data collected via embedded historians with additional data that is supplied by third parties. Triggering events can be defined for initiating aggregation of such history data with additional data, which enable a process/application to retrieve the operational metric data of the industrial unit/entity from any of a plurality of systems operatively coupled to such industrial unit/entity.

30 Claims, 10 Drawing Sheets

U.S. PATENT DOCUMENTS

| | | | |
|---|---|---|---|
| 6,298,393 B1 | 10/2001 | Hopsecger | |
| 6,298,454 B1 | 10/2001 | Schleiss et al. | |
| 6,385,496 B1 | 5/2002 | Irwin et al. | |
| 6,411,987 B1 | 6/2002 | Steger et al. | |
| 6,505,247 B1 | 1/2003 | Steger et al. | |
| 6,536,029 B1 | 3/2003 | Boggs et al. | |
| 6,539,271 B2 | 3/2003 | Lech et al. | |
| 6,559,861 B1 | 5/2003 | Kennelly et al. | |
| 6,574,639 B2 | 6/2003 | Carey et al. | |
| 6,584,488 B1 | 6/2003 | Brenner et al. | |
| 6,618,856 B2 | 9/2003 | Coburn et al. | |
| 6,633,782 B1 | 10/2003 | Schleiss et al. | |
| 6,701,324 B1 | 3/2004 | Cochran et al. | |
| 6,754,668 B2 | 6/2004 | Noble et al. | |
| 6,754,885 B1 | 6/2004 | Dardinski et al. | |
| 6,766,214 B1 | 7/2004 | Wang et al. | |
| 6,795,798 B2 | 9/2004 | Eryurek et al. | |
| 6,799,148 B2 | 9/2004 | Ling et al. | |
| 6,847,850 B2 | 1/2005 | Grumelart | |
| 6,847,854 B2 | 1/2005 | Discenzo | |
| 6,865,644 B2 | 3/2005 | Husted et al. | |
| 6,952,727 B1 | 10/2005 | Lindner et al. | |
| 6,975,913 B2 | 12/2005 | Kreidler et al. | |
| 7,043,311 B2 | 5/2006 | Nixon et al. | |
| 7,050,873 B1 | 5/2006 | Discenzo | |
| 7,069,201 B1 | 6/2006 | Lindner et al. | |
| 7,152,222 B2 | 12/2006 | Kumhyr et al. | |
| 7,181,370 B2 | 2/2007 | Furem et al. | |
| 7,206,646 B2 | 4/2007 | Nixon et al. | |
| 7,206,965 B2 | 4/2007 | Roddy et al. | |
| 7,218,974 B2 | 5/2007 | Rumi et al. | |
| 7,228,310 B2 | 6/2007 | O'Brien | |
| 7,249,356 B1 | 7/2007 | Wilson et al. | |
| 7,272,665 B2 | 9/2007 | Yamada et al. | |
| 7,275,062 B2 | 9/2007 | Deitz et al. | |
| 7,286,888 B2 | 10/2007 | Monette et al. | |
| 7,299,367 B2 | 11/2007 | Hamm et al. | |
| 7,328,078 B2 | 2/2008 | Sanford et al. | |
| 7,359,930 B2 | 4/2008 | Jackson et al. | |
| 7,406,453 B2 * | 7/2008 | Mundie et al. | 706/20 |
| 7,546,577 B2 | 6/2009 | Do et al. | |
| 7,568,184 B1 | 7/2009 | Roth | |
| 7,574,417 B1 | 8/2009 | McGreevy et al. | |
| 7,584,216 B2 | 9/2009 | Travieso et al. | |
| 7,616,095 B2 | 11/2009 | Jones et al. | |
| 7,620,885 B2 | 11/2009 | Moulckers et al. | |
| 7,627,385 B2 | 12/2009 | McGreevy et al. | |
| 7,672,740 B1 | 3/2010 | Baier et al. | |
| 7,684,876 B2 | 3/2010 | Grgic | |
| 7,693,585 B2 | 4/2010 | Kalan et al. | |
| 7,742,833 B1 | 6/2010 | Herbst et al. | |
| 2002/0019839 A1 | 2/2002 | Shiu | |
| 2002/0069235 A1 | 6/2002 | Chen | |
| 2002/0120744 A1 | 8/2002 | Chellis et al. | |
| 2002/0133523 A1 | 9/2002 | Ambler et al. | |
| 2002/0169907 A1 | 11/2002 | Candea et al. | |
| 2002/0174263 A1 | 11/2002 | Codd et al. | |
| 2002/0184601 A1 | 12/2002 | Fitzhenry et al. | |
| 2002/0184610 A1 | 12/2002 | Chong et al. | |
| 2003/0014130 A1 | 1/2003 | Grumelart | |
| 2003/0041135 A1 | 2/2003 | Keyes et al. | |
| 2003/0100958 A1 | 5/2003 | Cachat et al. | |
| 2003/0101208 A1 | 5/2003 | Chauvel et al. | |
| 2003/0130899 A1 | 7/2003 | Ferguson et al. | |
| 2003/0172107 A1 | 9/2003 | Leyfer et al. | |
| 2003/0182303 A1 | 9/2003 | Gibson | |
| 2004/0153437 A1 | 8/2004 | Buchan | |
| 2004/0181294 A1 | 9/2004 | Deitz et al. | |
| 2004/0225649 A1 * | 11/2004 | Yeo et al. | 707/3 |
| 2005/0071755 A1 | 3/2005 | Harrington et al. | |
| 2005/0085928 A1 | 4/2005 | Shani | |
| 2005/0198034 A1 | 9/2005 | Boyer | |
| 2005/0198406 A1 | 9/2005 | Sichner | |
| 2005/0203648 A1 | 9/2005 | Martin | |
| 2005/0210337 A1 | 9/2005 | Chester et al. | |
| 2006/0004827 A1 | 1/2006 | Stuart | |
| 2006/0020928 A1 | 1/2006 | Holloway et al. | |
| 2006/0026559 A1 | 2/2006 | Gunturi et al. | |
| 2006/0067334 A1 | 3/2006 | Ougarov et al. | |
| 2006/0161268 A1 * | 7/2006 | Frensch et al. | 700/1 |
| 2006/0259160 A1 * | 11/2006 | Hood et al. | 700/20 |
| 2006/0259499 A1 | 11/2006 | Moulckers et al. | |
| 2006/0291283 A1 | 12/2006 | Jin et al. | |
| 2006/0294502 A1 | 12/2006 | Das et al. | |
| 2007/0006039 A1 | 1/2007 | Fichter et al. | |
| 2007/0027913 A1 | 2/2007 | Jensen et al. | |
| 2007/0028070 A1 | 2/2007 | Avergun et al. | |
| 2007/0038610 A1 | 2/2007 | Omoigui | |
| 2007/0050348 A1 | 3/2007 | Aharoni et al. | |
| 2007/0073744 A1 | 3/2007 | McVeigh et al. | |
| 2007/0112447 A1 | 5/2007 | McGreevy et al. | |
| 2007/0112801 A1 | 5/2007 | McGreevy et al. | |
| 2007/0136533 A1 | 6/2007 | Church et al. | |
| 2007/0142941 A1 | 6/2007 | McGreevy et al. | |
| 2007/0156770 A1 | 7/2007 | Espelien | |
| 2007/0244964 A1 | 10/2007 | Challenger et al. | |
| 2007/0282577 A1 | 12/2007 | Lind | |
| 2007/0288795 A1 | 12/2007 | Leung et al. | |
| 2007/0294078 A1 | 12/2007 | Kim et al. | |
| 2008/0027678 A1 | 1/2008 | Miller | |
| 2008/0082577 A1 | 4/2008 | Hood et al. | |
| 2008/0126408 A1 | 5/2008 | Middleton | |
| 2008/0313228 A1 * | 12/2008 | Clark et al. | 707/104.1 |

FOREIGN PATENT DOCUMENTS

| | | |
|---|---|---|
| EP | 1109107 | 6/2001 |
| EP | 1307823 | 5/2003 |
| GB | 2347234 | 8/2000 |
| GB | 2353616 A1 | 2/2001 |
| WO | 2004027531 A1 | 4/2004 |
| WO | WO 2004027531 A1 * | 4/2004 |
| WO | 2005006130 A2 | 1/2005 |
| WO | 2005006130 A3 | 1/2005 |

OTHER PUBLICATIONS

CNOA Due Dec. 29, 2008 for Chinese Patent Application No. 200710162327.9, 6 pages.

European Search Report dated Jan. 20, 2009 for European Patent Application Serial No. EP08156281, 6 Pages.

"Major Canadian Natural Gas Producer Buys AnyWhere/AnyTime Services from Industrial Evolution" Mar. 12, 2001, Industrial Evolution pp. 1.

Real Time Intelligence at the Source-Deploying and EMbedded Historian. Users Conference 2005, pp. 1.

Miller, et al. "Extending the Reach of Enterprise Data Management in a World of M2M." ISA EXPO. Oct. 2005, pp. 1-7.

"Proficy Historian"; Dec. 16, 2004, GE FANUC, pp. 1-8.

European Search Report dated Feb. 22, 2008 for European Patent Application Serial No. EP 07 11 7388, 1 Page.

European Search Report dated Dec. 18, 2007 for European Patent Application Serial No. 07117364.5-2221, 2 Pages.

EP Office Action for Application No. 08165215.8-1243 dated Mar. 3, 2009, 2 pages.

European Search Report and Written Opinion for European Application No. EP 08 16 5215, dated Dec. 18, 2008, 6 pages.

Sakharov. Macro-Processing in High-Level Languages. ACM SIGPLAN Notices, vol. 27, No. 11, Nov. 1, 1992, pp. 59-66, XP000328425, ISSN: 0362-1340. Last accessed Jan. 20, 2009, 18 pages.

Cardoso, et al. Macro-Based Hardware Compilation of Java (TM) Bytecodes Into a Dynamic Reconfigurable Computing System, Apr. 21, 1999. In IEEE Seventh Symposium on Field Programmable Custom Computing Machines, (FCCM'99). Napa Valley, California, Apr. 21-23, 1999. http://citeseerx.ist.psu.edu/viewdoc/summary?doi=10.1.1.41.8292. Last accessed Jan. 21, 2008, 10 pages.

European Search Report dated Feb. 5, 2008 for European Patent Application No. EP07117614, 8 pgs.

Alvestrand. "Tags for the Identification of Languages: rfc 1766. txt," Internet Engineering Task Force, Mar. 1995, XP015007553, Issn: 0000-0003. ftp://ftp.isi.edu/in-notes/rfc1766.txt. Last accessed Jun. 6, 2008, 9 pages.

European Search Report dated May 2, 2008 for European Patent Application No. EP07117622, 2 pgs.

Power RICH System, Enterprise Edition, Historian (PRS EE Historian) Version 1.5, last accessed Dec. 3, 2008, 15 pages.
Wonderware Plant Intelligence Solution Helps Arla Foods Deliver Fresh Milk Products to the Tables of Europe. Last accessed Dec. 3, 2008, 4 pages.
OA dated Dec. 3, 2008 for U.S. Appl. No. 11/536,566, 35 pages.
OA dated Dec. 18, 2008 for U.S. Appl. No. 11/536,522, 15 pages.
OA dated Apr. 3, 2009 for U.S. Appl. No. 11/536,522, 20 pages.
OA dated Jul. 21, 2008 for U.S. Appl. No. 11/536,522, 21 pages.
OA dated Oct. 13, 2009 for U.S. Appl. No. 11/536,522, 22 pages.
OA dated Sep. 16, 2009 for U.S. Appl. No. 11/558,705, 23 pages.
OA dated Apr. 22, 2009 for U.S. Appl. No. 11/558,705, 23 pages.
OA dated Jul. 29, 2009 for U.S. Appl. No. 11/558,710, 18 pages.
OA dated Nov. 14, 2008 for U.S. Appl. No. 11/558,710, 18 pages.
OA dated Jul. 28, 2008 for U.S. Appl. No. 11/536,545, 26 pages.
OA dated Dec. 12, 2008 for U.S. Appl. No. 11/536,545, 18 pages.
OA dated Jul. 10, 2009 for U.S. Appl. No. 11/536,545, 30 pages.
OA dated Jan. 26, 2009 for U.S. Appl. No. 11/536,535, 40 pages.
OA dated Jul. 23, 2008 for U.S. Appl. No. 11/536,535, 31 pages.
OA dated Jun. 25, 2010 for U.S. Appl. No. 11/862,182, 41 pages.
OA dated Jul. 22, 2010 for U.S. Appl. No. 11/862,183, 39 pages.
OA dated Jul. 8, 2010 for U.S. Appl. No. 11/558,710, 28 pages.
OA dated Jul. 23, 2010 for U.S. Appl. No. 11/536,550, 51 pages.
OA dated Mar. 30, 2010 for U.S. Appl. No. 11/558,705, 44 pages.
European Search Report dated Mar. 25, 2010 for European Patent Application No. EP 07 12 0362, 6 pages.
"High Level Triggers, Data Acquisition and Controls." ATLAS Technical Design Report, Jun. 30, 2003, pp. 1-370, XP002570453, Chapters 1-7, 9, 11, 13. http://cdsweb.cern.ch/record/616089/files/cer-002375189.pdf. Last accessed Apr. 1, 2010, 196 pages.
Vermeulen, et al. "ATLAS Dataflow: the Read-Out Subsystem, Results from Trigger and Data Acquisition System Testbed Studies and from Modeling." 14th IEEE—NPSS Real time Conference, Stockholm, Sweden, Jun. 4-10, 2005, pp. 270-274, XP010859081, ISBN: 978-0-7803-9183-3.
Gameiro, et al. "The ROD Crate DAQ of the ATLAS Data Acquisition System." 14th IEEE—NPSS Real time Conference, Stockholm, Sweden, Jun. 4-10, 2005, pp. 527-531, XP010859117, ISBN: 978-0-7803-9183-3.
European Search Report dated Mar. 25, 2010 for European Patent Application No. EP 07 12 0357, 5 pages.
OA dated Apr. 1, 2010 for U.S. Appl. No. 11/863,216, 28 pages.
European Search Report dated Mar. 10, 2010 for European Application Serial No. EP 08 16 4957, 7 pages.
Charbonnier, et al. "Trends Extraction and Analysis for Complex System Monitoring and Decision Support." Feb. 1, 2005, Engineering Applications of Artificial Intelligence, Pineridge Press, Swansea, GB, pp. 21-36, XP025299588, ISSN: 0952-1976.
Uraikul, et al. "Artificial Intelligence for Monitoring and Supervisory Control of Process Systems." Nov. 30, 2006, Engineering Applications of Artificial Intelligence, Pineridge Press, Swansea, GB, pp. 115-131, XP005786108, ISSN: 0957-1976.
Office Action dated Jun. 11, 2010 for U.S. Appl. No. 11/862,180, 27 pages.
Office Action dated May 27, 2010 for U.S. Appl. No. 11/537,110, 77 pages.
A new general purpose compression method for searching in large collection, Bhadade, U.S.; Sharma, V.K.; Trivedi, A. I.; TENCON 2007-2007 IEEE Region 10 Conference Digital Object Identifier: 10.11 09ITENCON.2007.4428935 Publication Year: 2007 , pp. 1-4.
Input Data Representation for Self-Organizing Map in Software Classification, Yuqing Lin; Huilin Ye; Knowledge Acquisition and Modeling, 2009. KAM '09. Second International Symposium on vol. 2 Digital Object Identifier: 10.11 09/KAM.2009.151, Publication Year: 2009 , pp. 350-353.
Supervised and Traditional Term Weighting Methods for Automatic Text Categorization, Man Lan; Chew Lim Tan; Jian Su; Yue Lu; Pattern Analysis and Machine Intelligence, IEEE Transactions on vol. 31 , Issue: 4 Digital Object Identifier: 10.11 09/TPAMI.2008.11 0 Publication Year: 2009 , pp. 721-735.
Selecting predicate logic for knowledge representation by comparative study of knowledge representation schemes, Ali, A.; Khan, M.A.; Emerging Technologies, 2009. ICET 2009. International Conference on Digital Object Identifier: 10.11 091/ICET.2009.5353207 Publication Year: 2009 , pp. 23-28.
Notice of Allowance dated Jun. 13, 2010 for U.S. Appl. No. 11/862,891, 49 pages.
Notice of Allowance mailed Dec. 13, 2010 for U.S. Appl. No. 11/862,180, 74 pages.
OA dated Nov. 19, 2010 for U.S. Appl. No. 12/783,229, 41 pages.
European Search Report dated Oct. 22, 2010 for European Patent Application No. EP 08 16 5010, 10 pages.
OA dated Jan. 4, 2011 for U.S. Appl. No. 11/536,550, 44 pages.
Notice of Allowance mailed Nov. 9, 2010 for U.S. Appl. No. 11/537,110, 38 pages.
OA dated Aug. 23, 2010 for U.S. Appl. No. 11/558,705, 44 pages.
OA dated Sep. 17, 2010 for U.S. Appl. No. 11/864,634, 43 pages.
OA dated Oct. 14, 2010 for U.S. Appl. No. 11/862,861, 43 pages.
OA dated Mar. 22, 2011 for U.S. Appl. No. 12/783,229, 14 pages.
OA dated Mar. 21, 2011 for U.S. Appl. No. 12/691,302, 72 pages.
OA dated Mar. 31, 2011 for U.S. Appl. No. 11/537,144, 49 pages.

* cited by examiner

ADAPTIVE EMBEDDED HISTORIANS WITH AGGREGATOR COMPONENT

TECHNICAL FIELD

The subject invention relates generally to historian components associated with industrial controllers and more particularly to aggregating history data with additional (e.g., from third parties), to improve process management.

BACKGROUND

Manufacturers typically require collection, analysis, and optimization of real time data from a plurality of sites that are located globally. One common solution for recording such data includes providing a local recording module that often occupies a slot in a controller backplane such as a PC-Historian. The PC-Historian(s) can communicate with controllers directly through the backplane, or can communicate remotely via a network interface. In addition, such PC-Historian can enable archiving data from the controller to an Archive Engine which provides additional storage capabilities.

Typically, such controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company can have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with Food and Drug Administration regulations such as Regulation 21 CFR Part 11. One common solution for recording data includes providing a local recording module that often occupies a slot in a controller backplane such as a PC-Historian, which is an industrial computer for the controller backplane, and employs a transitional layer to supply an indirect interface to the controller. This includes a platform that provides high speed, time series, data storage and retrieval with both local and remote control processors. The PC-Historian communicates with controllers directly through the backplane and can communicate remotely via a network interface. The PC-Historian allows archiving data from the controller to an Archive Engine which provides additional storage capabilities.

In general, conventional historian processors enable high-speed real-time data collection by communicating directly with the control processor across the backplane for fast data collection speeds. The PC-Historian can enable archiving data from the controller to an Archive Engine which provides additional storage capabilities. Accordingly, such conventional historians can communicate with the control processor across the backplane, wherein large quantities of data are handled over extended time periods. Nonetheless, controllers typically have access to values of data that are current, as opposed to other type data and/or a trend that are related to history of data, and which can further facilitate process control.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for systems and methods that enable an embedded historian to automatically trigger an event, and aggregate additional data (e.g., from third party subscribers) with the data that is currently being acquired by the historian, via an aggregator component. In general, such embedded historians (unlike conventional PC historians) supply a direct interface to controllers without employing a transitional layer, and hence provide a substantially higher data exchange rate as compared to conventional PC historians. Additionally, a polling/publication arrangement can also be employed wherein the units associated with embedded historian(s) can identify respective data (e.g., availed by third parties) to the aggregator component upon occurrence of the predetermined triggering event.

In a related aspect, the aggregator component can receive data from third parties and/or subscribers to the industrial system based on predetermined criteria such as for example a requested time period, data type, occurrence of a triggering event, and the like. Such aggregator component can then aggregate and format collected operational metric data from third parties/subscribers and coalesce such data with collected historian data in to a storage medium for future troubleshooting of the industrial process and/or submission to controller components. The aggregated or coalesced formatted operational metric data set can then be communicated to an interface, such as a user interface for displaying the data set. Alternatively, the data set can be accessed by a local or remote process, an external user interface, an external consumer or another member or entity not part of entity from which the data set refers.

The aggregator component of the subject innovation facilitates management and administration of the industrial setting, to typically automate collection of data from third parties. Accordingly, by enabling an application to retrieve the operational metric data of the industrial unit/entity from any of a plurality of systems operatively coupled to such industrial unit/entity, the aggregator component supplies a consistent interface. For example, data collection from third parties can be enabled as though such parties were part of the industrial setting that hosts the aggregator component. Such an arrangement improves management, and in general mitigates a requirement for an administrator to individually retrieve data from third party entities. Moreover, system enhanced troubleshooting is enabled, since third party members can be considered as a collective whole (e.g., retrieving system wide performance) and/or members subscribing to the industrial setting can be identified to collect required data therefrom.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
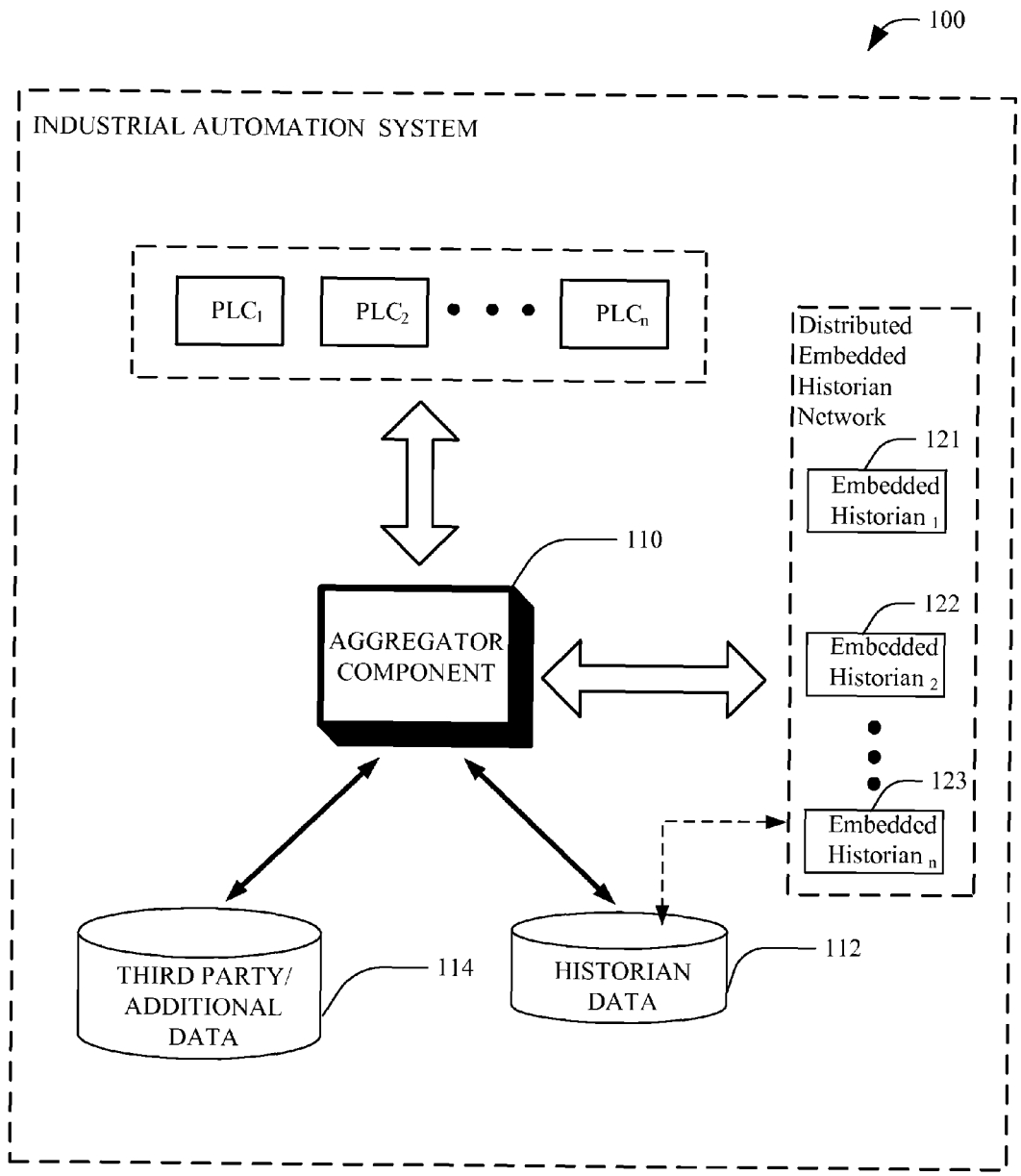
FIG. 1 illustrates a schematic block diagram of an aggregator component that facilitates data collection and management processes on the factory floor.

FIG. 1 illustrates an aggregator component 110 that is associated with an embedded historian network of an industrial automation system 100 (e.g., a network of controller devices), to facilitate data collection via the embedded historians 121, 122, 123 (where n is an integer.) The aggregator component 110 gathers and/or coalesces operational metrics (e.g., performance metrics, system events, system health, system status, and the like) with additional data that is collected from a plurality of third party subscribers/members. Such third party subscribers/members supply additional data 114, for aggregation with Historian data 112 (which is collected by the embedded historians 121, 122, 123), and cooperate as part of the industrial automation system 100. It is to be appreciated that third party subscribers can include a plurality of members (e.g., computers, servers, machines) for example, which can be coupled to a network (not shown) for interaction with the industrial automation system 100. For example, an external provider/consumer of data can supply additional data 114 for aggregation with historian data 112, via the aggregator component 110. Additionally, a separate user interface (not shown) can connect to one of the computer systems through the network to retrieve raw or aggregated metric data or connect to one of the interfaces to retrieve raw or aggregated metric data. Such interface can provide aggregated information of the entity as a whole through the operation gathering of aggregator component 110.

The embedded historians 121, 122, 123 can be part of a hierarchically structured data model for the industrial automation system 100, wherein by employing the hierarchically structured data model the aggregator component 110 can typically mitigate a requirement for an additional layer of software to collect the data 112 from the embedded historians 121, 122, 123. Any of a plurality of event triggers for aggregation of history data 112 with third party data 114 can be programmed into the aggregator component 110, to initiate aggregation based on such event triggers, as described in detail infra.

Moreover, the aggregator component 110 can implement a data package (common data model that is based upon an industry standard, such as ISA-S88, ISA-S95, etc., which is automatically completed and/or configured in a manner that is readily understood by designated devices/systems. For example, the data package can be formatted in accordance with a common data model that is based upon an industry standard, such as ISA-S88, ISA-S95, and the like. The aggregator component 110 can further enable a user, to program the relationship among data that is to be aggregated with the historians, controllers, industrial devices (e.g., a sensor) and other logical variables. Moreover, reporting events (e.g., type of data being aggregated) can be generated for aggregation of specific data structures related to the industrial plant, with third party additional data.

The aggregator component 110 can further create and/or modify a tag, a name or reference for a device and/or logical variable related to the embedded historians(s) (e.g., without a physical address such as a network address, an Internet protocol (IP) address, and the like) for such device and/or logical variable. Moreover, the aggregator component 110 can create and/or modify a tag associated with a historian within an industrial automation environment, and physical location of such tag within the hierarchical structure. Tags in a micro-historian can be automatically created, and set up as a default collection for a plant scan, such that when a plant comes on-line, the embedded historians announce their presence to the aggregator component 110.

For example, the aggregator component 110 can allow creation of processing parameters associated with the embedded historians 121, 122, 123 such as for example: tag names, data models, hierarchies, and the like—without typically employing any information related to the physical location of each input and/or output. Such aggregator component 110 can further automatically aggregate data collected via the embedded historian with third party data associated with the industrial setting.

Figure 2:
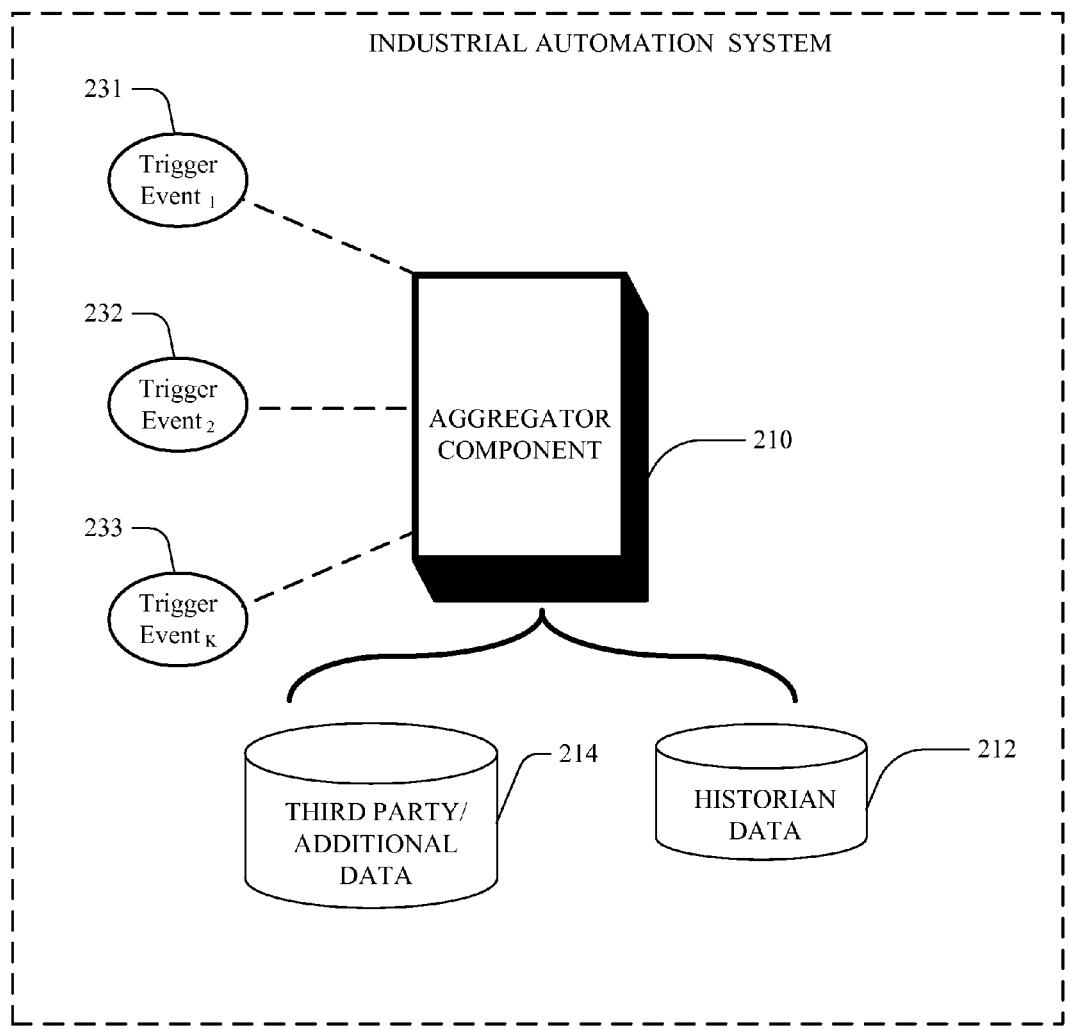
FIG. 2 illustrates a further exemplary aspect of an aggregator component that employs a plurality of triggering events, to initiate an aggregation of data collected via embedded historians

FIG. 2 illustrates a further exemplary aspect of an aggregator component 220 that employs a plurality of triggering events, to initiate an aggregation of data collected via embedded historians The triggering events 231, 232, 233 (1 to k, where k is an integer) can include events such as an alarm, a predetermined condition, receiving a message to execute a particular functional block, locating data input for a functional block, executing a predetermined order for the functional block, execution of a functional block and the like.) Hence, initiation for aggregating of third party data 214 and data collected via embedded historians can be enabled by generation of events 231,232, 233 (e.g., for third parties and/or subscribing members). For example, such aggregation can be performed via employing various statistical analysis (e.g., summing, averaging, and the like) and/or employing predetermined models for aggregation based on type of data, industrial units, process parameters, and the like. As another example for operation of the aggregator component 210, triggering events can relate to storage levels of data stores (e.g., storage capacity) and utilization of storage capacity, to provide aggregation upon reaching a predetermined storage capacity. It is to be appreciated that triggering events 231, 232, 233 can also be characterized as general purpose interrupts that can be triggered at the occurrence of a predetermined condition.

Figure 3:
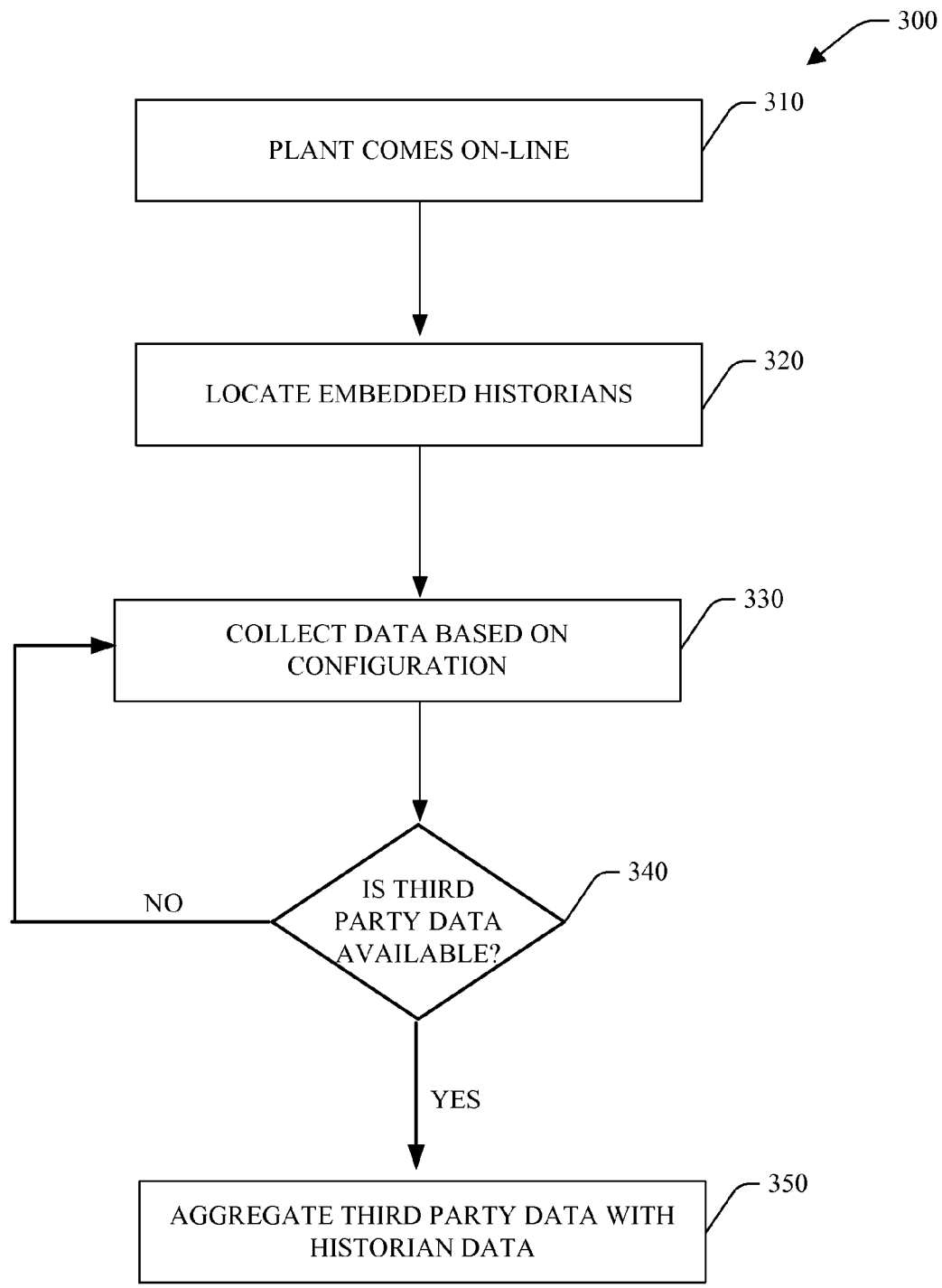
FIG. 3 illustrates a related methodology of aggregating history data (collected via embedded historians) with additional third party data in accordance with an aspect of the subject innovation.
Figure 4:
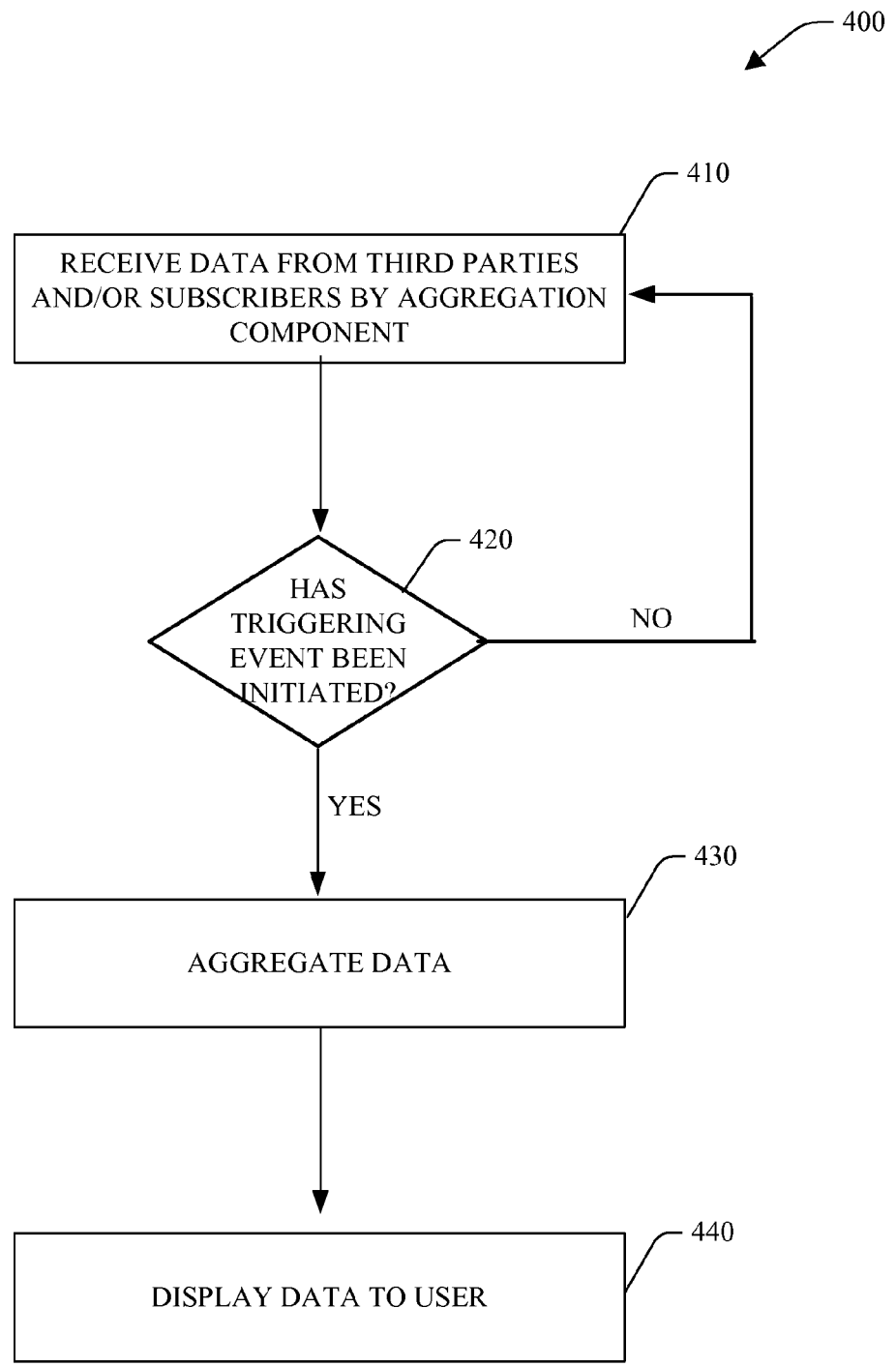
FIG. 4 illustrates a further methodology of aggregating history data and display of such aggregated data to users.

FIG. 3 illustrates a related methodology of aggregating history data collected via embedded historians with additional third party data in accordance with an aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 310, Initially and at 310, an industrial plant that employs a plurality of embedded historians comes on-line. Subsequently, such embedded historians can be located at 320. For example, the embedded historians can identify themselves to the industrial plant and accept a configuration for data collection. At 330, such embedded historians can be configured for data collection according to a predetermined setting. For example, tags in embedded historians can be automatically created, and be set up as a default collection for a plant scan, such that when a plant comes on-line, the historians announce their presence to such plant, and are discovered by the aggregator component for aggregation of data with additional data supplied by third parties. Moreover, the configuration of the embedded historians can include, editing process variables, automation device names, creating tag references, data models, hierarchy, simulation of industrial processes, and the like. Based on such configuration, historians can collect data related to the industrial process. At 340 a determination is made as to availability/presence of other third party data that should be aggregated with history data gathered by embedded historians. If so, the aggregation occurs at 350. For example, such aggregation can be performed via employing various statistical analysis (e.g., summing, averaging, and the like) and/or employing predetermined models for aggregation based on type of data, industrial units, process parameters, and the like. If no third party data is available, the methodology 300 loops back to act 330.

In a related methodology 400 of data aggregation and display, initially and at 410 additional data (e.g., from third parties) can be received by the aggregator component at 410. Such receipt of data from third parties and/or subscribers to the industrial system can occur based on predetermined criteria such as for example a requested time period, detection of a data type, and the like. Next and at 420, a determination is made to verify whether a triggering event that initiates aggregation of history data with data collected via embedded historians, has been initiated. If so, data can be aggregated at 430, followed by display of such aggregated at 440. Otherwise, the methodology 400 returns to act 410 to receive data from third parties and/or subscribers of such industrial setting.

Figure 5:
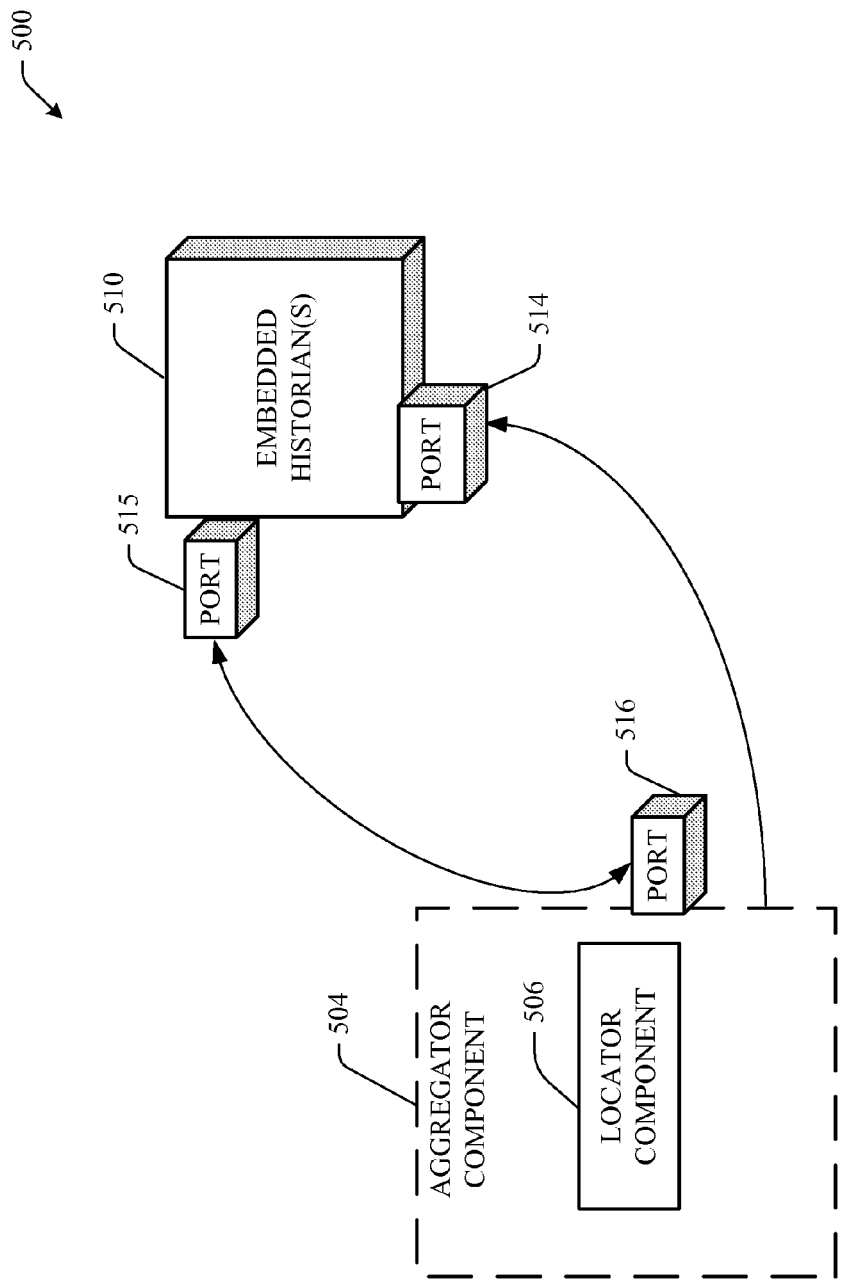
FIG. 5 illustrates a block diagram for an aggregator component that includes a locator component, in accordance with a particular aspect of the subject invention.

FIG. 5 illustrates a block diagram 500 for an aggregator component 504 that includes a locator component 506, in accordance with a particular aspect of the subject invention. The locator component 506 can employ a socket arrangement, wherein the embedded historian 510 initially identifies itself to the network and the central aggregator component via a socket bound to a specific port number 514. Such socket can function as one end point of two-way communication link between programs running on a network or the aggregator component 504, and it can be bound to a port number for identification purposes during data communication. Likewise, on the aggregator component 504, the port number 516 to which the embedded historian component communicates with, can be identified. To initiate a connection, the aggregator component 504 can attempt a rendezvous with the embedded historian component on the port 514 associated with such embedded historian component. Upon acceptance of the connection, a new socket (and consequently a new port 515) can be assigned, so that the embedded historian 510 can continue to listen to the original socket for connection request, while supplying data to the aggregator component 504 via the newly created socket.

Figure 6:
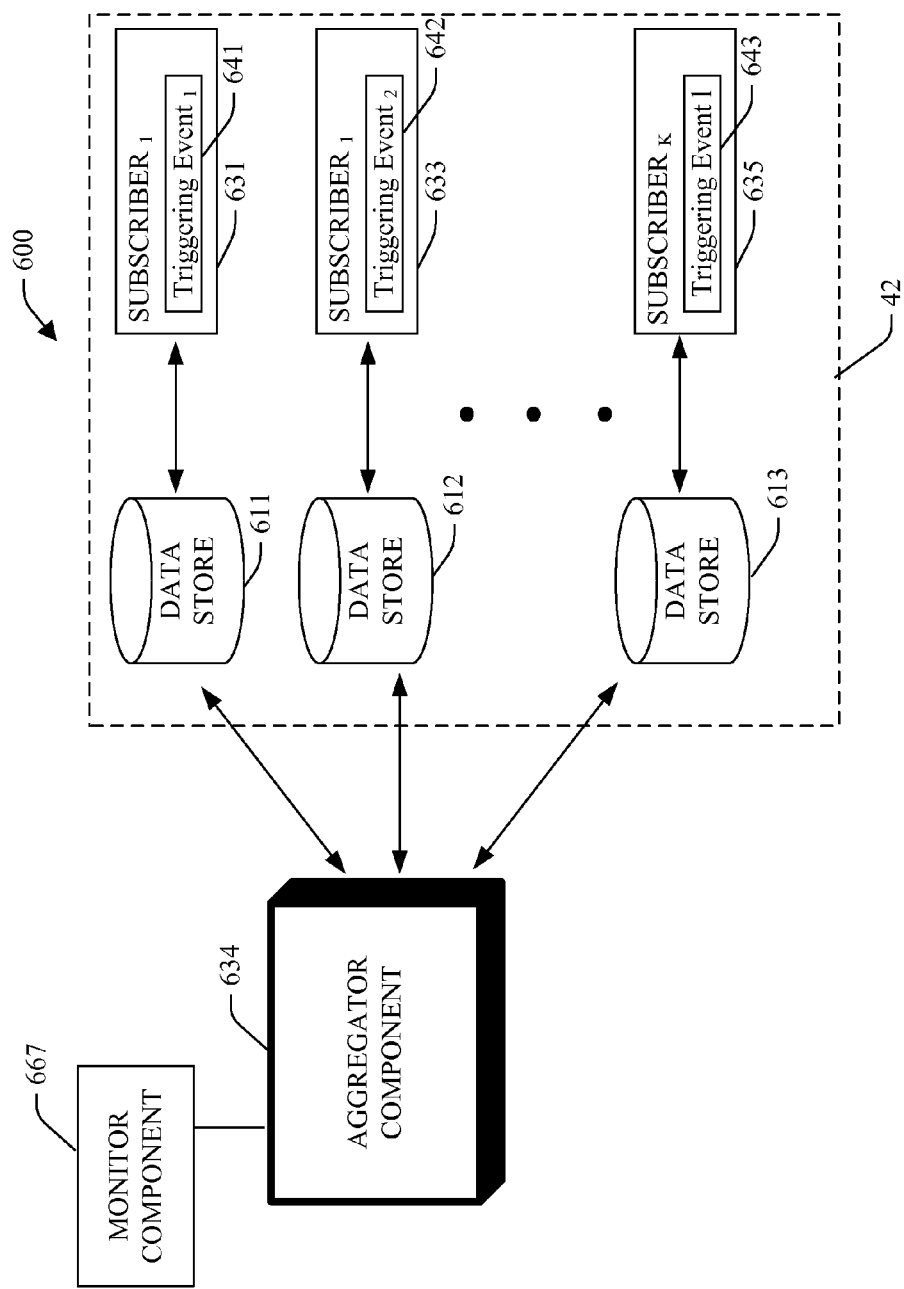
FIG. 6 illustrates an arrangement for evaluation of operation metrics for an industrial setting, which employs an aggregator component in accordance with an aspect of the subject innovation

FIG. 6 illustrates an arrangement for evaluation of operation metrics for an industrial setting 600, which employs an aggregator component 634 in accordance with an aspect of the subject innovation. Each subscriber member (e.g., third party) 631, 633, 635 (1 to k, where k is an integer) can subscribe to the industrial setting 600 and supply data in addition to data collected by the embedded historians. Such subscriber members 631, 633, 635 can further include system monitors (not shown) that monitor member specific operational metrics and log such information to an associated data store 611, 612 613. Moreover, the aggregator component 634 can include a monitor component 667 that monitors aggregator specific operational metrics and log such information. For example, for performance metrics, the monitor component 667 periodically retrieves performance data values of different metrics from a performance data stores 611, 612, 613 provided by third parties. The monitor component 667 can periodically log the performance data values in the data store related to that particular member. Triggering events 641, 642, 643 (1 thru 1, 1 being an integer) can also be associated with each of the subscribers 631, 633, 635. Upon initiation of such triggering events, each subscriber 631,633, 635 can identify itself to the aggregator component 634 for aggregation of respective data. As explained in detail infra, the triggering events can include events such as an alarm, a predetermined condition, receiving a message to execute a particular functional block, locating data input for a functional block, executing a predetermined order for the functional block, execution of a functional block and the like.) Hence, initiation for aggregating of third party data and data collected via embedded historians can be enabled by generation of such events (e.g., for third parties and/or subscribing members), wherein typically collection of data from subscribers 631, 633, 635 is substantially automated. Accordingly, by enabling an application to retrieve the operational metric data of the industrial unit/entity from any of a plurality of systems operatively coupled to such industrial unit/entity, the aggregator component 634 supplies a consistent interface. For example, data collection from subscribers can be enabled as though such parties were part of the industrial setting that hosts the aggregator component. Such an arrangement improves management, and in general mitigates an administrator to individually retrieve data from third party entities.

Figure 7:
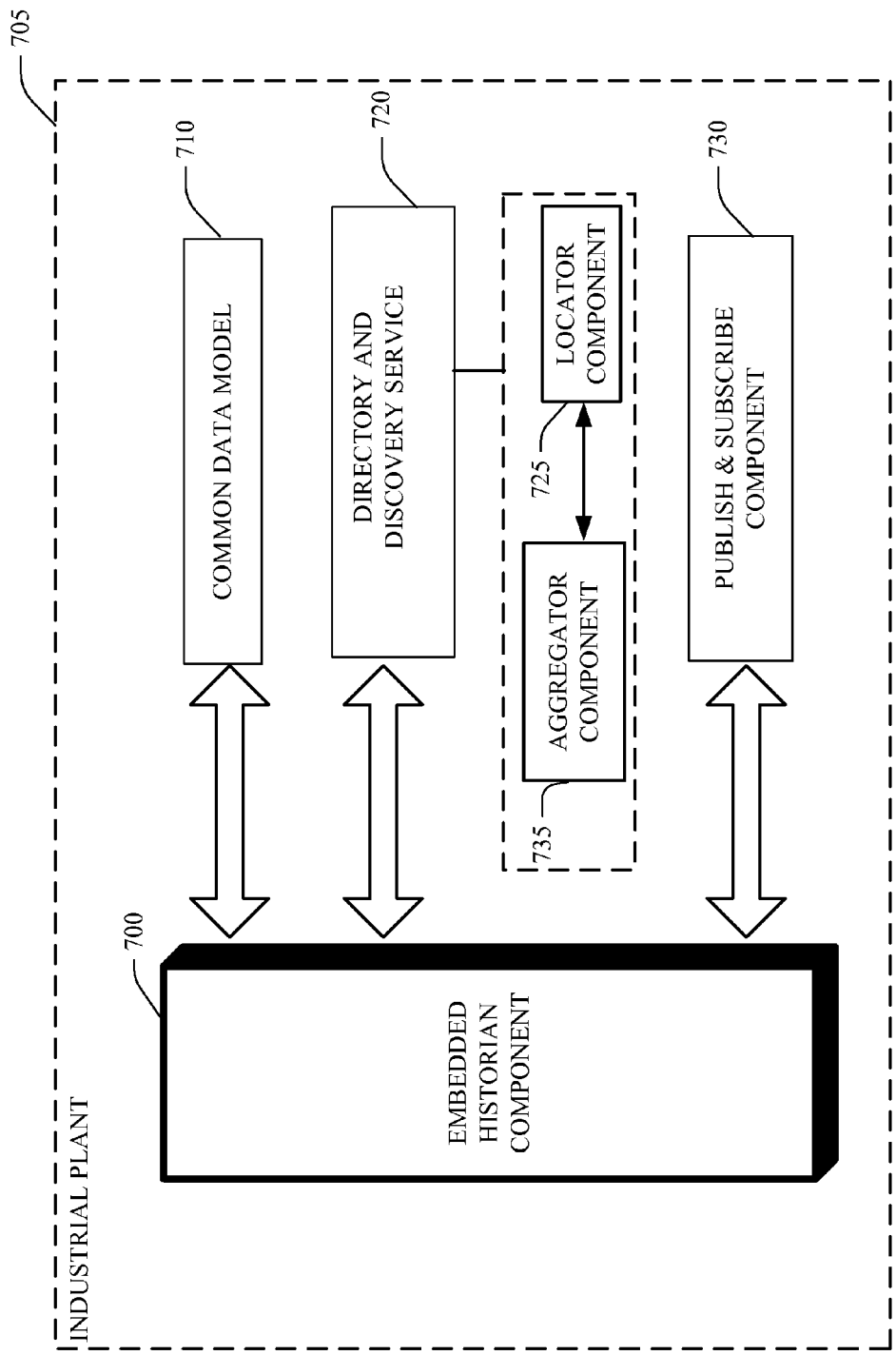
FIG. 7 illustrates an aggregator component that is connected to a locator component, which interacts with the historian network/historians.

FIG. 7 illustrates an aggregator component 735 that is connected to a locator component 725, which interact with the historian network/historians 700 in accordance with an aspect of the subject innovation. The industrial setting 705 can employ a hierarchical data model with various level; e.g., enterprise level, site level (factory represented within a data packet), area level (an area within the factory associated with the data); line level (a line associated with particular data), a work-cell level (that indicates a work-cell associated with the data) and the like. For example, by employing a nested, hierarchical data model, historian components 700 can readily become aware of data associated therewith. Furthermore, such hierarchy can further be customized by users to obtain increased granularity within the hierarchy. The common plant model can enable the historian component 700 to determine data contexts in an automated manner. The common data model 710 allows data to be marked or labeled via metadata for example to both expose historian functionality to a system and/or to allow the embedded historian component 700 to be automatically integrated within the system according to data that is exposed to the historian component. For example, one such labeling can pertain to security, and typically can affect substantially all components in the system associated with the common model 710.

The aggregator component 735 and the locator component 725 can be associated with a directory and discovery service. Such an arrangement enables the historian component 700 to be located and identified to the aggregator component 735, for aggregation of associated data with third party members. The locator component 725 can further identify other embedded historian components in the system and to receive/expose historian data to other system components. This can include a network directory that determines physical addresses from logical names and vice versa, for example. Moreover, the publish and subscribe component 730 can provide subscription functionality to third parties who intend to share data with the industrial plant 705, wherein data collection efficiency of the system can be enhanced. For example, the publish and subscribe component 730 of the industrial plant 705 allows third parties identify themselves when a triggering event has been detected. Moreover, third parties can subscribe to the publish and subscribe component 730, to supply respective data to the aggregator component 735 upon initiation of a triggering event. Such polling/publication arrangement can also be employed wherein the historians (e.g., micro-historians) identify themselves to the locator component 725 for aggregation of data thereof, upon occurrence of a predetermined event, and/or periodically. Furthermore, the locator component 725 can employ a trail of metadata to identify historians and relevant historian data for collection.

Figure 8:
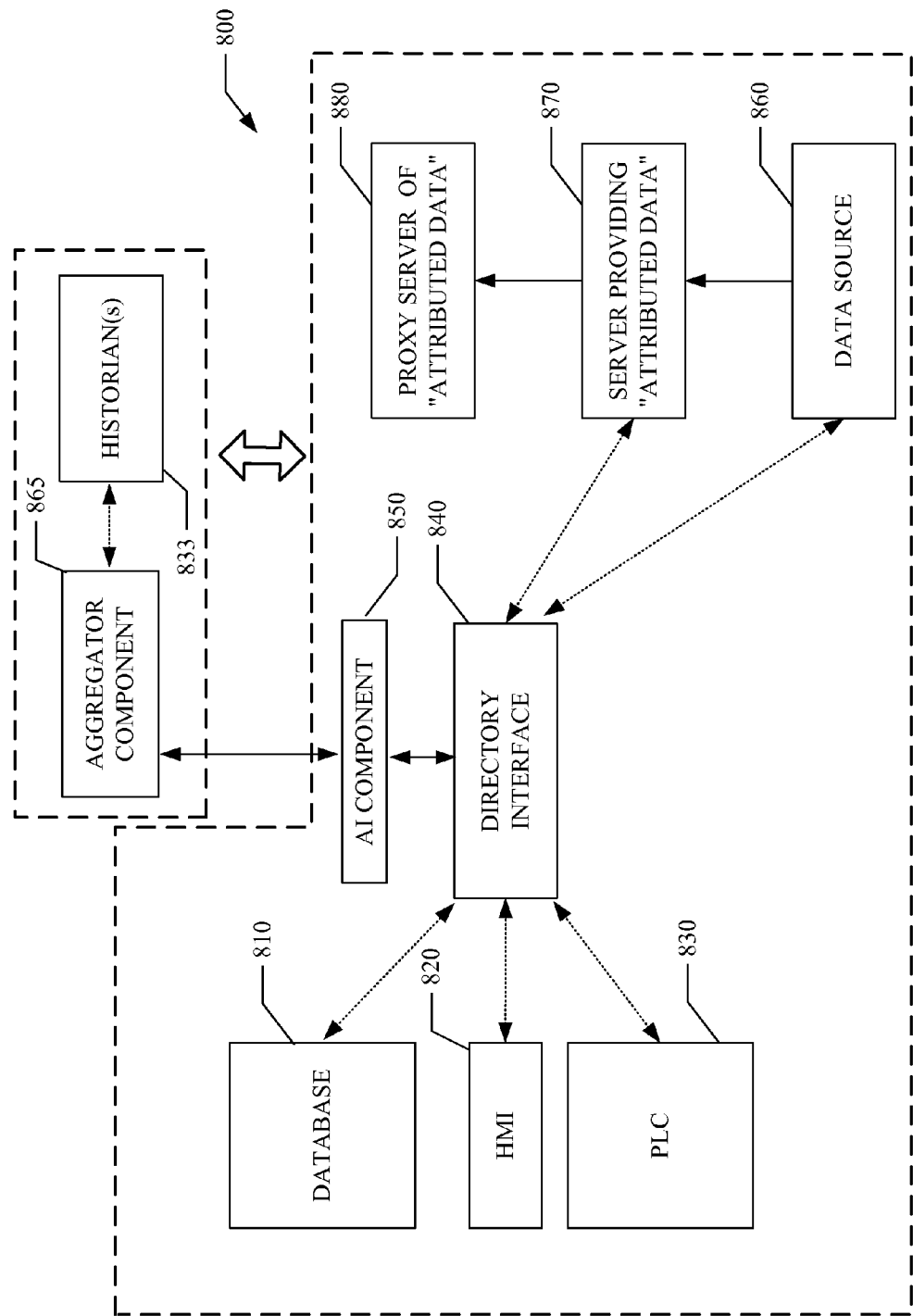
FIG. 8 illustrates an exemplary industrial automation network that employs an aggregator component that aggregates data collected by a historian component with third party data.

FIG. 8 illustrates an exemplary industrial automation network that employs an aggregator component 865 that aggregates data collected by a historian(s) 833 with third party data. The aggregator component 865 can receive data from third parties and/or subscribers to the industrial system based on predetermined criteria such as for example a requested time period, data type, occurrence of a triggering event, and the like. The aggregator component 865 can then aggregate and format collected operational metric data from third parties/subscribers and coalesce such data with collected historian data in to a storage medium for future troubleshooting of the industrial process and/or submission to controller components.

The industrial setting 800 can include a database 810, a human machine interface (HMI) 820 and a programmable logic controller (PLC) 830, and a directory interface 840. The directory interface 840 can further associate with an Artificial Intelligence (AI) component 850 to facilitate efficient aggregation of desired data within a particular network/application. The directory interface 840 can be employed to provide data from an appropriate location such as the data source 860, a server 870 and/or a proxy server 880. Accordingly, the directory interface 840 can point to a source of data based upon role and requirements (needs) of a requester (e.g., database 810, HMI 820, PLC 530, and the like.) The database 810 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 840 can provide data to the database 810 from the server 870, which provides data with the attributes desired by the database 810.

As illustrated in FIG. 8, the historian 833 can leverage directory interface 840 and other Unified Plant Model (UPM) services to locate other historian components, via the locator component (not shown) of the subject innovation. Such locator component can further detect historians 833 that are distributed on the back plane of an industrial network. The locator component 860 can be part of applications running on a control unit, which can function as a management control center for the industrial network system.

Moreover, the HMI 820 can employ the directory interface 840 to point to data located within the system 800. The HMI 820 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 820 can request data to have particular visualization attributes associated with data in order to easily display such data thereto. For example, the HMI 820 can query the directory interface 840 for a particular data point that has associated visualization attributes. The directory interface 840 can determine the proxy server 880 contains the attributed data point with the desired visualization attributes. For instance, the attributed data point can have a particular graphic that is either referenced or sent along with the data such that this graphic appears within the HMI environment instead of or along with the data value.

As explained earlier, the PLC 830 can be any number of models such as Allen Bradley PLC5, SLC-500, MicoLogix, and the like. The PLC 830 is generally defined as a specialized device employed to provide high-speed, low-level control of a process and/or system. The PLC 830 can be programmed using ladder logic or some form of structured language. Typically, the PLC 830 can utilize data directly from a data source (e.g., data source 860) that can be a sensor, encoder, measurement sensor, switch, valve and the like. The data source 860 can provide data to a register in a PLC and such data can be stored in the PLC if desired. Additionally, data can be updated (e.g., based on a clock cycle) and/or output to other devices for further processing.

Figure 9:
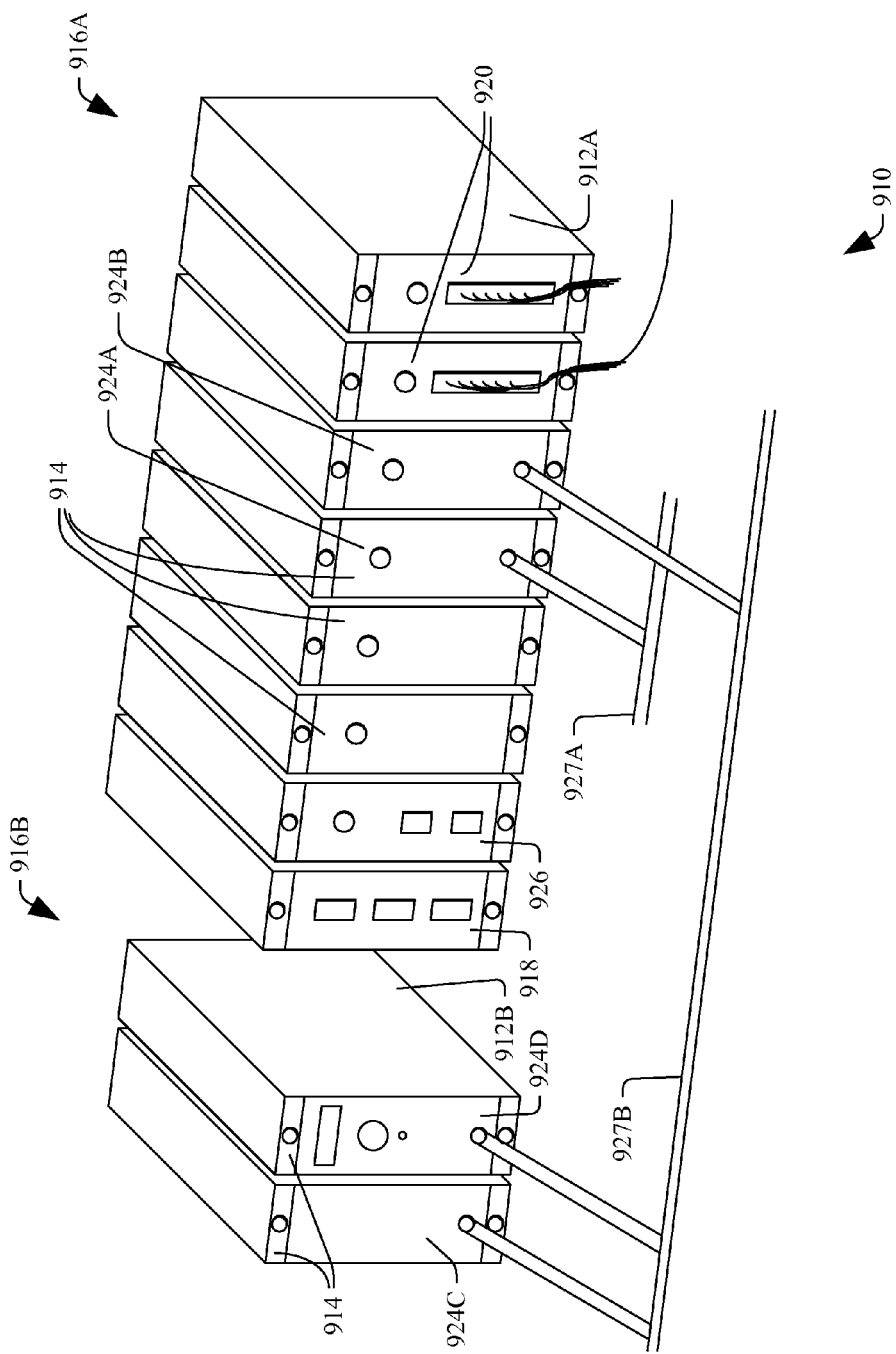
FIG. 9 illustrates a distributed industrial control system suitable for use with the subject innovation.
Figure 10:
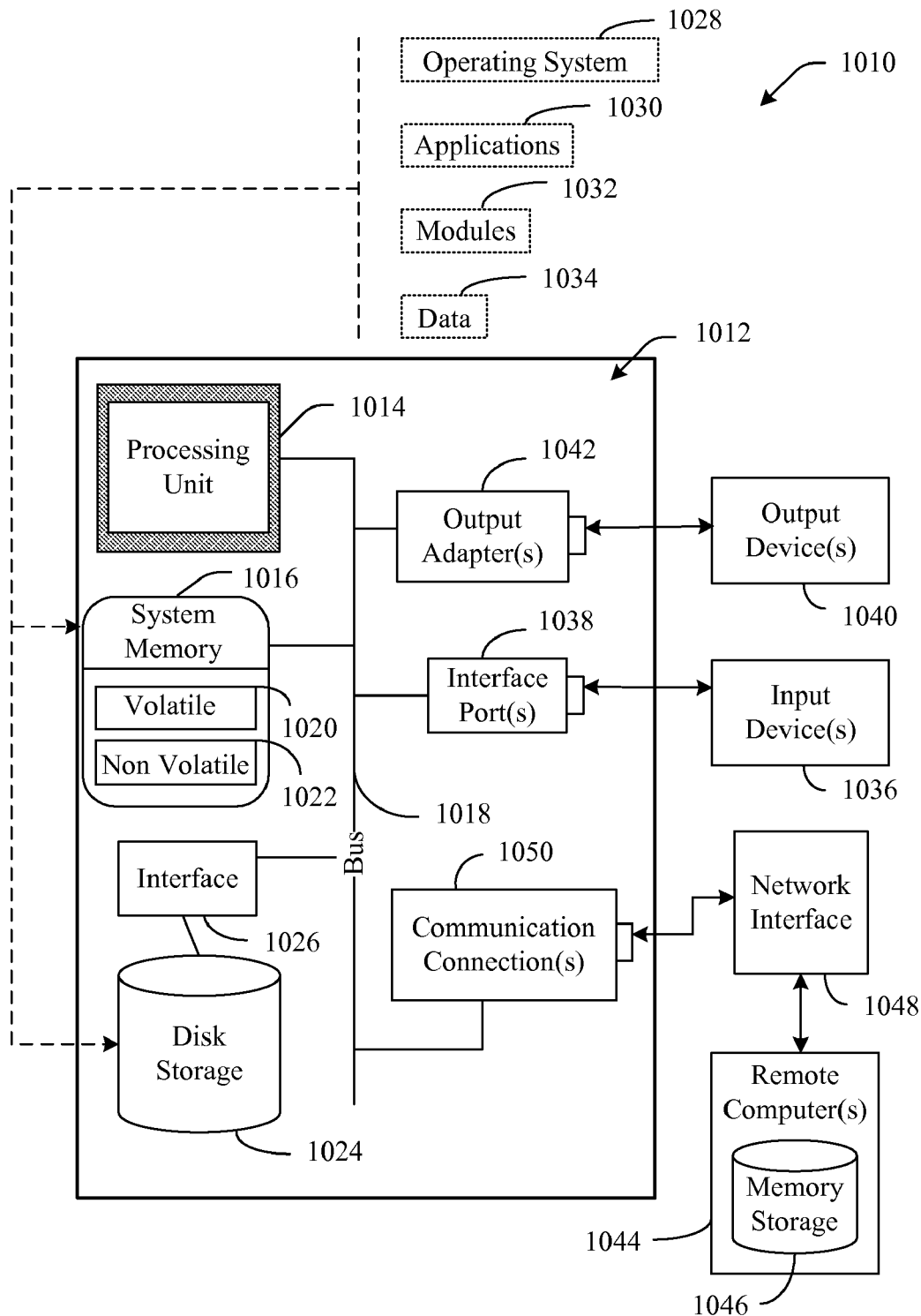
FIG. 10 illustrates an exemplary computing environment that can be implemented as part of an aggregator component in accordance with an aspect of the subject innovation.

In order to provide context for the various applications in which the aspects of the innovation may be carried out, an exemplary control system that can employ a locator component that tracks embedded historians is now illustrated and described with respect to FIGS. 9 and 10. However, it will be appreciated that the various aspects of the innovation may be employed in association with controllers and control systems other than those illustrated and described herein. A distributed industrial control system 910 suitable for use with the subject innovation provides a first and second rack 912A and 912B for holding a number of functional modules 914 electrically interconnected by backplanes 916A and 916B running along the rear of the racks 912A and 912B respectively. Each module 914 may be individually removed from the rack 912A or 912B thereby disconnecting it from its respective backplane 916 for repair or replacement and to allow custom configuration of the distributed system 910.

The modules 914 within the rack 912A can include, for example, a power supply module 918, a processor module 926, two communication modules 924A and 924B and two I/O modules 920. A power supply module 918 receives an external source of power (not shown) and provides regulated voltages to the other modules 914 by means of conductors on the backplane 916A. The I/O modules 920 provide an interface between inputs from, and outputs to external equipment (not shown) via cabling 922 attached to the I/O modules 920 at terminals on their front panels. The I/O modules 920 convert input signals on the cables 922 into digital words for transmission on the backplane 916A. The I/O modules 920 also convert other digital words from the backplane 916A to the necessary signal levels for control of equipment.

The communication modules 924A and 924B provide a similar interface between the backplane 916A and one of two external high speed communication networks 927A and 927B. The high speed communication networks 927A and 927B may connect with other modules 914 or with remote racks of I/O modules 920, controller configuration tools or systems, or the like. In the example illustrated in FIG. 9, the high speed communication network 927A connects with backplane 916A via the communication module 924A, whereas the high speed communication network 927B connects the communication module 924B with communication modules 924C and 924D in rack 912B. The processor module 926 processes information provided by the communication modules 924A and 924B and the I/O modules 920 according to a stored control program or routine, and provides output information to the communication module 924 and the I/O modules 920 in response to that stored program and received input messages.

FIG. 10 illustrates an exemplary environment 1010 for implementing various aspects of the aggregator component, which can include computer 1012, in accordance with an aspect of the subject innovation. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
    a plurality of industrial automation devices within the industrial automation system, that include a plurality of embedded historians adapted to collect historian data associated with the industrial automation system; and
    an aggregator component that aggregates the historian data with additional data for the industrial automation system, wherein the additional data is supplied via third parties, wherein the aggregator component initiates the aggregation based in part on one or more triggering events.

2. The industrial automation system of claim 1 further comprising a publication arrangement that determines availability of the additional data from the third parties.

3. The industrial automation system of claim 1 further comprising an organizational hierarchy data model with nodes that represent units associated with the industrial automation system.

4. The industrial automation system of claim 1 further comprising an artificial intelligence component that facilitates aggregation of the historian data with the additional data by employing at least one artificial intelligence technique.

5. The industrial automation system of claim 1 further comprising a Human Machine Interface (HMI) to graphically display a view of the industrial automation system.

6. The industrial automation system of claim 1 further comprising a graphical user interface (GUI) that forms an application view of a historian data collection system.

7. The industrial automation system of claim 1, wherein at least one of the plurality of embedded historians is associated with at least one of a controller, a module in a chassis, a server, a sensor, or a factory component.

8. The industrial automation system of claim 1 further comprising a locator component that identifies the plurality of embedded historians distributed within the industrial automation system.

9. The industrial automation system of claim 1, wherein the aggregator component at least one of creates or modifies one or more tags associated with the plurality of embedded historians.

10. The industrial automation system of claim 1, further comprising, a monitor component that at least one of monitors or logs aggregator specific operational metrics associated with the aggregator component.

11. A method of locating historians within an industrial plant comprising:
   employing an embedded historian located within an industrial automation device of the industrial plant, to collect history data from the industrial automation device associated with an industrial process;
   aggregating the history data with additional data, supplied via one or more third parties, to facilitate management of the industrial process; and
   employing a polling mechanism for at least one of detection or identification of the one or more third parties.

12. The method of claim 11 further comprising configuring the embedded historian to a predetermined setting for collection of the history data.

13. The method of claim 11 further comprising defining a common organizational data model for a plant associated with the industrial process.

14. The method of claim 11 further comprising employing a directory to track source of the history data.

15. The method of claim 11 further comprising collecting the history data across a plurality of levels of the industrial plant.

16. The method of claim 11 further comprising enabling creation of processing parameters associated with the embedded historian without employing information related to a physical location of at least one of input or output.

17. The method of claim 11 further comprising defining a triggering event for initiating data aggregation.

18. The method of claim 17 further comprising verifying occurrence of the triggering event.

19. The method of claim 18 further comprising displaying the aggregated data to a user.

20. The method of claim 18 further comprising self identifying the embedded historian via one or more tags created therein.

21. The method of claim 11 further comprising employing one or more predetermined models for the aggregating act.

22. A computer implemented system comprising the following computer executable components:
   at least one processor, associated with an embedded historian integrated within an industrial automation device, that executes a data collection component with direct interface to a controller without employing a transitional layer, to supply collected history data;
   an aggregator component that aggregates the history data with additional data supplied via one or more third parties; and
   a publish and subscribe component to determine availability of the additional data from the one or more third parties, to the aggregator component.

23. The computer implemented system of claim 22 further comprising a database that services the data collection component.

24. The computer implemented system of claim 22, wherein the aggregator component is part of an application that runs on a control unit of an industrial plant.

25. The computer implemented system of claim 22 wherein the embedded historian identifies itself to the aggregator component via a socket bound to a specific port number.

26. An industrial controller system comprising:
   means for collecting history data related to an industrial process, the means for collecting is embedded within an industrial automation device;
   means for aggregating the history data with additional data that is supplied via one or more third parties, upon occurrence of a triggering event; and
   means for identifying suppliers of the additional data.

27. The industrial controller system of claim 26 further comprising means for graphically displaying a view of an industrial control system.

28. The industrial controller system of claim 27 wherein the means for aggregating at least one of creates or modifies a tag associated with the embedded historian.

29. The industrial controller system of claim 28 further comprising means for displaying the aggregated data to a user.

30. The industrial controller system of claim 27 further comprising means for representing units associated with an industrial plant, within the industrial controller system, as nodes.

* * * * *